Patented Oct. 7, 1952

2,613,156

UNITED STATES PATENT OFFICE 2,613,156

THERMOPLASTIC ADHESIVE COMPOSITIONS

Ralph C. McGaffin, Plainfield, N. J., and Alfred G. Battaglia, New York, N. Y., assignors to National Starch Products Inc., New York, N. Y., a corporation of Delaware No Drawing. Application July 21, 1949, Serial No. 106,092

8 Claims. (Cl. 106—170)

This invention relates to an improved thermoplastic adhesive and a method for manufacture thereof. More specifically, it relates to an adhesive which produces a film which is dry and non-tacky under room temperature conditions, but which becomes tacky and highly adhesive upon the subsequent application of heat.

An object of our invention is to produce a thermoplastic adhesive which may be applied to labels, cartons, boxes, and other surfaces, and which will dry to a film so non-tacky that during the manufacture, shipping, storage, and use of these products, they will not tend to block—that is, to stick to one another, either permanently or momentarily, but which at the time of application, when heat is applied, will attain their full adhesive power.

Thermoplastic adhesive compositions ordinarily consist of a thermoplastic polymeric material such as a resin base together with a plasticizing material. The plasticizer is necessary in order that the composition may become sufficiently adhesive and tacky at the desired temperature and (where desired) to attain delayed tack. "Delayed tack" refers to the characteristic whereby a thermoplastic composition, after being heated to a temperature where it becomes adhesive and tacky, thereafter retains its tacky adhesive quality for an interval after heating is discontinued. This property is of interest for certain industrial applications, though not all. However, the use of a plasticizer is essential in practically all commercial thermoplastic adhesive compositions.

The use of ordinary liquid plasticizers—such as, for example, tricresyl phosphate and dibutyl phthalate—was marked by the disadvantage that these liquid plasticizers activated the resin base immediately upon contact therewith, even before heating took place. In other words, a composition containing a resin base together with an effective quantity of a liquid plasticizer, when spread upon labels, carton flaps, or similar surfaces, frequently resulted in a film which was tacky even at room temperature. As already explained, this tackiness represented a grave disadvantage in the manufacture, storage, and use of such adhesive-coated products.

We have now discovered that an excellent thermoplastic adhesive composition, whose dried films are non-tacky, smooth, and free from graininess, and which become powerfully tacky upon heating, may be produced by the following two major steps:

Step I.—Coalescing, either by heating and melting, or by solution in a common solvent, a thermoplastic polymeric material together with a suitable proportion of a plasticizer which is normally solid at ordinary room temperatures: Whether coalesced by heating or solution, the result is a clear, homogeneous fluid wherein the thermoplastic polymer and plasticizer no longer exist in physically independent relationship, but are mutually dissolved or dispersed in one another. Regardless of whether this coalescing of the polymer and plasticizer results from the heat or solution in a common solvent, or whether there be involved a liquid or solid solution, the net effect is a coalescing of the thermoplastic polymer and plasticizer. Thus, when using the term "coalescing" in the claims, we comprehend both the heat-fusion or the common solvent methods of combining the thermoplastic polymer and plasticizer.

Step II.—Emulsifying the plasticized thermoplastic polymer of Step I in water containing an appropriate emulsifying agent.

Additional optional steps will be discussed subsequently, but the result of the above two major steps is as follows:

When the plasticized thermoplastic polymer (either in the form of a solution or a hot fluid) is emulsified in water, it is, of course, broken up into innumerable small globules or particles, each globule or particle surrounded by a film of emulsifying agent. As the emulsion cools, there occurs within each globule a separation of a portion of the normally solid plasticizer. Thus, each globule in the cooled emulsion may be pictured as an entity consisting of a core of partially plasticized thermoplastic polymer (since it is clear that not all of the plasticizer separates out) surrounded and coated by the separated solid plasticizer, the entire unit being further protected by a film of the emulsifying agent. When this emulsion, or dispersion, is coated upon a surface and permitted to dry, there results a smooth, non-tacky film. Although the prior coalescing of the thermoplastic polymer and plasticizer would have been presumed to result in a tacky, adhesive mass, it is believed that the fact that each particle of thermoplastic polymer is coated with solid plasticizer prevents any tackiness in the dried film, at room temperatures. Furthermore, as a result of the emulsification procedure, the dried film consists not of a coalesced mass, nor of a mere mechanical mixture of thermoplastic polymer and plasticizer, but rather of innumerable entities, each comprising a core of plasticized thermoplastic polymer coated with solid plasticizer and further coated with a film of the emulsifying agent. The total effect of the coalescing plus emulsification procedure is an adhesive film characterized by far more uniform dispersion of the thermoplastic polymer and solid plasticizer, and by smaller particles of plasticizer; the film, therefore, being smooth and non-grainy, as well as non-tacky, at ordinary room temperatures.

As the adhesive base in our product, we may use any polymeric material, or combination of such materials, which are characterized by thermoplastic properties. The particular thermoplastic base may be chosen to meet specific conditions and circumstances under which the adhesive is to be employed. Examples of such thermoplastic bases include polyvinyl acetate, polyvinyl chloride, polyvinyl acetate-chloride copolymer, polyvinylidene chloride (Saran), methacrylic resin (Acrysols), non-drying alkyds, non-drying phenolics, polystyrenes, polyamides, thermoplastic cellulose esters and ethers, coumarone-indene resins, ester gums, synthetic rubber types, and the like. For brevity, we shall sometimes refer hereinafter to such thermoplastic materials as "resins" or "thermoplastic resins," since such resins constitute a large class of such materials.

As the plasticizer, we may use any one, or more than one, which is solid at normal room temperatures. Examples of such plasticizers are diphenyl phthalate, triphenyl phosphate, diphenyl, tridichlorphenyl phosphate, Santowax M and P (and which we believe to be meta- and para-terphenyls), triparatertiary butyl phenyl phosphate (sold under the trade name Plasticizer 7), n-cyclohexyl paratoluene sulphonamide (such, for example, as is sold under the trade name Santicizer 1-H), ethyl ortho benzoyl benzoate (as sold under the trade name Ketonone E), a suitable mixture of ortho- and para-toluene sulfonamides (such, for example, as is sold under the trade name Santicizer 9), and dicyclohexyl phthalate. Here, too, the plasticizer may be chosen in the light of the particular thermoplastic polymeric material employed, following data on compatibilities of plasticizers and resins now widely known.

With reference to the proportion of plasticizer to be used, it is obvious that this may vary over a very wide range, not only because of the great number of possible resins and plasticizers available, and the variance in their compatibilities, but because of the variation in degree of plasticization and tack required in the final product, for varying commercial applications. The quantity of plasticizer to be used generally varies with the molecular weight of the particular resin base in the composition, as well as with the degree of eventual plasticity and tack desired in the final adhesive. Thus, a low molecular weight polyvinyl acetate will require less plasticization than high molecular weight polyvinyl acetate or high molecular weight polyvinylidene chloride or methacrylates. As for the minimum quantity of plasticizer to be used, this obviously will also vary with the particular plasticizer and resin-plasticizer combination; but, in all cases, the amount of plasticizer should be in excess of that which remains compatible and merged with a given resin after the steps of melting or dissolving the resin and plasticizer, emulsifying, and cooling have taken place. It is well known to those in the art that any given plasticizer has a known or measurable degree of compatibility with a given resin, this degree of compatibility varying as between different resins and plasticizers. For any particular resin, there is a ratio of a given plasticizer which will remain in a state of coalescence with the resin (i. e., compatible), whereas any quantity above that limit will not remain in a state of coalescence with the resin for any substantial length of time (i. e., incompatible). But, since it is a fundamental requirement of our invention that there be a separation of solid plasticizer from the fused or dissolved resin-plasticizer mass, it follows that enough plasticizer must be used to compensate for that quantity which will remain within the resin, and to have present an excess of plasticizer which will separate out. To determine the amount of plasticizer to be used for any given combination of resin and plasticizer, it is only necessary to melt together a small portion, spread the fluid on a glass or similar surface, allow to cool, and note whether separation occurs. Such separation is ordinarily obvious to the naked eye, although microscopic examination may also be employed. If no separation occurs, then larger proportions of the plasticizer are required. When a quantity is arrived at which does result in separation of plasticizer, then that plasticizer-resin ratio is suitable for use in making our product. Further increases in plasticizer, as already stated, will depend upon other factors, including the temperature or range of temperatures at which it is desired that the dried adhesive film shall become tacky, etc. In the examples given below, the plasticizer is in the proportion by weight of one part of the resin to one to five parts of the plasticizer.

The procedure in making our product is simple, merely comprising fusing—as, for example, by heating—the thermoplastic polymer such as the resin and plasticizer to melt them to a homogeneous, fluid form, and pouring the hot fluid, with agitation, into hot water (preferably substantially above 100° F.), containing one or more emulsifying agents. It will be obvious to those familiar with the art that the amount of water will depend upon the particular solids content and viscosity desired in the final product. Any suitable emulsifying agents or protective colloids may be employed—such, for example, as polyvinyl alcohol, dioctyl sodium sulfosuccinate (of the type sold by American Cyanamid & Chemical Corporation under the trade name Aerosol OT), 33% aqueous solution of an alkyl aryl polyether alcohol (of the type sold by Rohm & Haas under the trade name Triton NE), long-chain fatty acid partial esters of hexitol anhydrides and polyoxyalkylene derivatives of these partial esters (sold by the Atlas Powder Company under the trade names Spans and Tweens, respectively), polymerized organic salts of sulfonic acid of both the alkyl-aryl and aryl-alkyl types (such, for example, as sold by the Dewey & Almy Chemical Company under the trade name Daxad 23), sodium carboxymethylcellulose, alginates, and bentonite. The said "Spans" are essentially partial esters of the common fatty acids (lauric, palmitic, stearic and oleic) and hexitol anhydrides (hexitans and hexides) derived from sorbitol; Span 40—sorbitan monopalmitate; Span 60—sorbitan monostearate. The said "Tweens" are derived from the Span products by adding polyoxyethylene chains to the non-esterified hydroxyls; Tween 40—polyoxyethylene sorbitan monopalmitate; Tween 60—polyoxyethylene sorbitan monostearate.

Agitation of the plasticized resin in water is continued until a homogeneous emulsion is formed, the temperature being maintained above the softening point of the plasticized resin. Then the emulsion is permitted to cool, and is ready for use as an adhesive.

As has already been indicated, the step of heating and fusing the thermoplastic polymer such as the resin and plasticizer may be replaced by dissolving the two components in a common solvent and, therefore, continuing with the emulsification procedure as above indicated, although by the latter method, the water containing the emulsifying agent need not be heated.

We have herein described the two major steps necessary for the preparation of our product—namely, coalescing of resin-plasticizer (by melting or solution) and emulsification. However, we have discovered that additional improved properties may be obtained by employing one or more of the following additional steps:

(a) In order to give the ultimate dried adhesive film (prior to heat activation) an even smoother, more slippery surface, with further increased resistance to blocking, we sometimes incorporate with the resin and plasticizer a minor proportion of a wax or waxy substance—such, for example, as opal wax, candelilla wax, and the like. By "minor proportion" we refer to quantities preferably below 20%, based on the combined weight of resin and plasticizer. The wax is best incorporated with the resin-plasticizer during the initial melting or solution (step I).

(b) It has already been pointed out that after the emulsion is cooled and, even more particularly, after the adhesive is deposited upon a surface as a film, and dried, a substantial portion of the plasticizer separates from the resin, coating the resin particles and preventing tackiness. This separation of the plasticizer from the resin is desirable and, indeed, essential to our process. On the other hand, when the dried adhesive surface is finally heated, in order to fuse and merge the resin and plasticizer and bring about full tackiness and adhesive strength, it is then important that the plasticizer shall remain merged and compatible with the resin. To this end, we prefer to add a material known in the art as a flux—that is, a substance which will promote the ultimate fusion of resin and plasticizer and which will thereafter increase the compatibility of the resin and plasticizer. As flux agents, it is generally preferred to use rosin derivatives, such as the various resinates, or the dispersions of modified rosins sold under the trade name Dresinols, Dresinol 40 being an ammoniacal dispersion prepared from a partially isomerized light colored rosin; the dispersion having a total solids content of approximately 40%. We ordinarily prefer to add the flux to the cooled emulsion of the plasticized resin (in other words, after the completion of step II). The quantity of flux may be varied over a wide range, depending chiefly upon the particular flux chosen, and the compatibility of the particular combination of resin-plasticizer in question, but we ordinarily employ no more than about 20% of the flux (solids content), based upon the total weight of the plasticized resin-water emulsion.

(c) It has already been pointed out that when the final plasticized resin emulsion is spread upon a surface and dried, the film consists of innumerable globules, or particles, each comprising a core of partially plasticized resin surrounded by solid plasticizer plus an outer coating of the emulsifying agent. This is, therefore, essentially a discontinuous film. When the film is deposited upon surfaces—such, for example, as on paper labels—which may be subject to flexing and bending, there sometimes occurs a cracking or powdering off of some of the dry adhesive. In order to avoid such a condition, it is advisable to add to the emulsion a minor proportion of a substance which will form a continuous film and act as a binder for the adhesive globules. Such a binder may consist of any suitable substance capable of forming a continuous, relatively flexible film. Representative suitable binding agents are the emulsions or dispersions, either singly or in admixture, of natural or synthetic rubbers, or resins, such as a copolymer of acrylonitrile and butadiene dispersion (as sold under the trade name Hycar), aqueous dispersions of acrylic polymers (as, for example, Acrysols C-9, WA-5, ER or MR), polyvinyl acetate, polyvinyl chloride. Other suitable film-forming binding agents will readily suggest themselves to those familiar with the art.

We prefer to keep the proportion of binder at a minimum, and find that quantities less than 10% (the solids content of the binder being calculated upon the total weight of the adhesive emulsion) are ordinarily sufficient.

The following examples will further illustrate the embodiment of our invention:

*Example I*

In this, and in the subsequent examples, all parts given are by weight.

Ten (10) parts polystyrene (molecular weight 10,000–15,000) and 40 parts diphenyl phthalate are mixed and heated together at approximately 190° F., forming a clear fluid. While still at this temperature, the fluid is poured into a solution of 6 parts of a 25% aqueous solution of Aerosol OT and 4.5 parts polyvinyl alcohol (of the grade sold under the trade name Elvanol 50-42) in 75.5 parts water; the solution being at a temperature of approximately 190° F. Constant agitation is maintained, resulting in a homogeneous emulsion. The emulsion is then permitted to cool.

A portion of this emulsion was spread upon one surface of 60 lb. kraft paper, by means of a doctor blade or a standard roller coating machine. The thickness of the wet film was .0015 inch. After drying at room temperature for 24 hours, the film was smooth, non-grainy, and entirely free of tackiness. Upon heating to 170° F., the film became powerfully tacky and adhesive. After heat was withdrawn, the film remained tacky for a period of 70 seconds, before returning to its non-tacky state.

*Example II*

Ten (10) parts polyamide resin, a base resin formed by the reaction of the dimerized and trimerized linoleic and linolenic acids of soybean oil with ethylene diamine (of the type sold by General Mills under the trade name Polyamide No. 93), are melted together with 30 parts dicyclohexyl phthalate, forming a clear fluid. While still hot and fluid, this plasticized resin is poured, with constant agitation, into 80 parts of water, heated to 180° F., and containing dissolved therein 4 parts sodium carboxymethylcellulose (of the type sold under the trade name Sodium CMC4WM) with 6 parts Triton NE. The resulting emulsion is permitted to cool. Surfaces coated with this emulsion are found to possess the advantageous properties described in Example I.

*Example III*

Ten (10) parts ethyl cellulose, low viscosity, are heated together with 40 parts triphenyl phosphate, until both are melted. The hot, clear fluid is poured, with constant agitation, into 70 parts of water heated to 195° F. and containing dissolved therein 4.5 parts of polyvinyl alcohol (of the type sold under the trade name Elvanol 52-22), 3 parts Span No. 60, and 3 parts Tween No. 60. The resulting emulsion is permitted to cool. Surfaces coated with this emulsion are found to possess the advantageous properties described in Example I.

*Example IV*

Ten (10) parts of polyvinyl acetate (a low molecular weight type, as sold under the trade name Polyvinyl Acetate AYAB) are heated and melted together with 30 parts of Santicizer 1–H. The hot, clear fluid is emulsified, with constant agitation, in 75 parts water heated to 190° F. and containing dissolved therein 4 parts Elvanol 50–42, 3 parts Span No. 40, and 3 parts Tween No. 40. The emulsion is permitted to cool. Surfaces coated with this emulsion are found to possess the advantageous properties described in Example I.

*Example V*

Twenty (20) parts of a glycerol ester of hydrogenated rosin (of the type sold under the trade name Stabellite Ester No. 10) are heated and melted together with 20 parts of Ketonone E. The hot, clear fluid is emulsified, with constant agitation, in 55 parts of water heated to 190° F. and containing therein 3.0 parts Elvanol 52-22, 2 parts bentonite, and 6 parts 25% aqueous solution of Aerosol OT. The emulsion is permitted to cool. Surfaces coated with this emulsion are found to possess the advantageous properties described in Example I.

*Example VI*

This example particularly illustrates the use of blends of resins, to attain desired effects with regard to adhesion to certain surfaces, temperatures at which the adhesive will become and remain tacky, and the like.

Five (5) parts polystyrene (molecular weight 10,000 to 15,000) are heated and melted together with 15 parts of polymerized rosin (of the type sold under the name Polypale Resin) and 50 parts diphenyl phthalate. The resulting hot, clear fluid is emulsified, with continuous agitation, in 75.5 parts of water maintained at 190° F. and containing dissolved therein 4.5 parts Elvanol 50–42 and 6.0 parts 25% aqueous solution of Aerosol OT. The emulsion is permitted to cool. Surfaces coated with this emulsion are found to possess the advantageous properties described in Example I.

*Example VII*

This example particularly illustrates the use of waxes in order to impart further increased properties of "slip" and non-tackiness to the dry adhesive film, prior to heat activation.

Ten (10) parts of Stabellite Ester No. 10 are heated and melted together with 10 parts of opal wax and 50 parts of diphenyl phthalate. The hot, clear fluid is emulsified in the same manner as described in Example VI, and the emulsion permitted to cool. Films formed by the emulsion dried to produce surfaces characterized by the advantageous properties already described and which were particularly notable for their slippery smoothness.

*Example VIII*

This example particularly illustrates the use of flux materials, such as rosin derivatives, to increase the compatibility of resin and plasticizer after heat activation.

Twenty-five (25) parts of the cooled emulsion of Example I are mixed with 5 parts of Dresinol 40 (this being, as previously noted, the trade name of an ammonium hydroxide dispersion of modified rosin). This product, as compared to that of Example I, is characterized by stronger and more permanent adhesion to some surfaces, because of the more complete compatibility achieved between resin and plasticizer.

*Example IX*

This example illustrates the initial merging of resin and plasticizer by solution in a common solvent, rather than by melting.

Eighty (80) parts of diphenyl phthalate and 20 parts of polyvinyl acetate (of the grade sold under the trade name Polyvinyl Acetate V2½) are dissolved in 80 parts ethyl acetate. The clear solution is poured, with continuous agitation into 110 parts of water containing 4.5 parts Elvanol 50–42 and 2 parts of Daxad 23. When emulsification is complete, the solvent is removed from the system by steam distillation or other convenient means. The emulsion is coated upon surfaces, and when dry exhibits the excellent characteristics previously described.

*Example X*

This example particularly illustrates the use of a binder in conjunction with the adhesive of our invention.

To 25 parts of the cooled emulsion of Example I, there are added, with agitation, 2 parts of Geon Polyblend 550X20 (this being the trade named used for a product which we believe consists of polyvinyl chloride plasticized with Hycar nitrile rubber.

As compared to the product of Example I, this product dries to films which show improved resistance to powdering off or cracking when the surface (i. e., label, carton flap, etc.) is flexed.

We are aware that it has been proposed to mix, by purely mechanical means, a thermoplastic resin with a normally solid plasticizer—more specifically, by grinding the solid plasticizer in a ball mill or similar comminuting equipment, and then mechanically mixing this with the resin. Contradistinguished from this, our product, in its final form, prior to heat activation, consists of innumerable particles—each particle comprising a core of partially plasticized resin surrounded by and coated with solid plasticizer. In other words, we have here no mere mechanical mixture of resin particles and separate and discrete plasticizer particles, but, rather, a system wherein each particle of resin is in the closest and most intimate contact with it own plasticizer. Furthermore, as a result of the emulsification step in our process, the individual particles, both of resin and plasticizer, can approach considerably smaller particle size than is feasible by any mechanical grinding methods. In other words, our product is characterized by smaller particle size and far more intimate relationship between plasticizer and resin than has been attainable by any previously taught method. The result is that our product not only produces a more homogeneous, smoother, less grainy film, but, because of the close physical contact between the plasticizer and the resin (the resin itself already being partially plasticized), it is found that dried films of our adhesive are much more readily and completely activated upon application of heat, and, furthermore, require lower temperatures to achieve such activation, as contrasted, for example, to mere mechanical and physically separate mixtures of plasticizers and resins. Under modern industrial methods, whereby high speed, automatic labeling and gluing machines are so widely used, this property of immediate and complete activation, at relatively lower temperatures, is of the utmost importance.

Also, not only is our product substantially improved over heretofore known materials, but our process is simpler and, therefore, economically more feasible, particularly since our method does not depend upon the relatively slow and unwieldy procedure for grinding plasticizers.

Summarizing, our process comprises, firstly, the merging or coalescing by melting or solution of a thermoplastic polymeric material and a plasticizer which is normally solid at room temperatures, and, secondly, the emulsification of the plasticized polymeric material. As additional improvements, we have described the use of waxes, fluxes, and binders. The adhesive emulsion of our invention, when spread upon surfaces and dried, results in films characterized by notable smoothness, nongraininess, and freedom from any tackiness at room temperatures, but which become powerfully tacky and adhesive upon application of heat.

We claim:

1. The method of making a thermoplastic adhesive composition for production of dried adhesive films which are non-tacky at room temperatures but which are activatable to a tacky and adhesive condition by heat, which consists in coalescing a thermoplastic polymeric material and an normally solid plasticizer, and in then emulsifying the resulting coalesced product yielding an emulsion of particles of the plasticized polymeric material, the plasticizer being present in a proportion greater than that which is compatible at room temperatures with the thermoplastic polymeric material to provide two plasticizer parts in the dried adhesive film of the composition, one part, being compatible with the thermoplastic polymeric material, remaining in a state of coalescence with the same and producing particles of plasticized thermoplastic polymeric material, and the other part, constituting an excess incompatible with the thermoplastic polymeric material, separating out from the state of coalescence therewith and forming solid plasticizer particles distributed in the thermoplastic polymeric material.

2. The method of making a thermoplastic adhesive composition for production of dried adhesive films which are non-tacky at room temperatures but which are activatable to a tacky and adhesive condition by heat, which consists in heating and thereby fusing a thermoplastic polymeric material and a normally solid plasticizer, in then mixing with accompanying agitation the resulting heated fusion product with heated water containing an emulsifying agent thereby emulsifying said fusion product yielding an emulsion of particles of the plasticized polymeric material, and in then cooling the emulsion, the plasticizer being present in a proportion greater than that which is compatible at room temperatures with the thermoplastic polymeric material to provide two plasticizer parts in the dried adhesive film of the composition, one part, being compatible with the thermoplastic polymeric material, remaining in a state of fusion with the same and producing particles of plasticized thermoplastic polymeric material, and the other part, constituting an excess incompatible with the thermoplastic polymeric material, separating out from the state of fusion therewith and forming solid plasticizer particles distributed in the thermoplastic polymeric material.

3. The method of making a thermoplastic adhesive composition for production of dried adhesive films which are non-tacky at room temperatures but which are activatable to a tacky and adhesive condition by heat, which consists in dissolving in a common solvent a thermoplastic polymeric material and a normally solid plasticizer, and in then mixing with accompanying agitation the resulting solution product with water containing an emulsifying agent thereby emulsifying the resulting solution product yielding an emulsion of particles of the plasticized polymeric material, the plasticizer being present in a proportion greater than that which is compatible at room temperatures with the thermoplastic polymeric material to provide two plasticizer parts in the dried adhesive film of the composition, one part, being compatible with the thermoplastic polymeric material, remaining in a state of solution with the same and producing particles of plasticized thermoplastic polymeric material, and the other part, constituting an excess incompatible with the thermoplastic polymeric material, separating out from the state of solution therewith and forming solid plasticizer particles distributed in the thermoplastic polymeric material.

4. The method of making a thermoplastic adhesive composition for production of dried adhesive films which are non-tacky at room temperatures but which are activatable to a tacky and adhesive condition by heat, which consists in coalescing a thermoplastic polymeric material and a normally solid plasticizer, and in then emulsifying the resulting coalesced product yielding an emulsion of particles of the plasticized polymeric material, the plasticizer being present in a proportion by weight of one part of the polymeric material to one to five parts of the plasticizer and thereby greater than that which is compatible at room temperatures with the thermoplastic polymeric material to provide two plasticizer parts in the dried adhesive film of the composition, one part, being compatible with the thermoplastic polymeric material, remaining in a state of coalescence with the same and producing particles of plasticized thermoplastic polymeric material, and the other part, constituting an excess incompatible with the thermoplastic polymeric material, separating out from the state of coalescence therewith and forming solid plasticizer particles distributed in the thermoplastic polymeric material.

5. The method of claim 1, in which there is incorporated in the composition a binder serving as a film-forming bond between the emulsion particles of the plasticized thermoplastic polymeric material.

6. The method of claim 5, in which the binder is a resin binder the solids content of which is in the proportion by weight of 10% based on the total weight of the emulsion.

7. The thermoplastic adhesive composition produced by the method of claim 1.

8. A thermoplastic solid adhesive film consisting of a coating of the thermoplastic adhesive composition produced by the method of claim 1.

RALPH C. McGAFFIN.
ALFRED G. BATTAGLIA.

REFERENCES CITED

The following references are of record in the file of this patent:

UNITED STATES PATENTS

| Number | Name | Date |
|---|---|---|
| 2,319,852 | Doolittle | May 25, 1942 |
| 2,462,029 | Perry | Feb. 15, 1949 |
| 2,486,756 | Murphy | Nov. 1, 1949 |
| 2,525,671 | Hauser | Oct. 10, 1950 |

FOREIGN PATENTS

| Number | Country | Date |
|---|---|---|
| 501,810 | Great Britain | Mar. 2, 1939 |